Dec. 25, 1962

R. S. NEASHAM 3,070,792

AERIAL NAVIGATION TRACK DISPLAY

Filed Dec. 10, 1959

Inventor
ROBERT S. NEASHAM

By R. S. Tompkin
Attorney

Dec. 25, 1962 R. S. NEASHAM 3,070,792
AERIAL NAVIGATION TRACK DISPLAY
Filed Dec. 10, 1959 2 Sheets-Sheet 2

Inventor
ROBERT S. NEASHAM

By R. I. Tompkins
Attorney

United States Patent Office 3,070,792
Patented Dec. 25, 1962

3,070,792
AERIAL NAVIGATION TRACK DISPLAY
Robert S. Neasham, 415 Fort Hunt Road,
Alexandria, Va.
Filed Dec. 10, 1959, Ser. No. 858,832
7 Claims. (Cl. 343—5)
(Granted under Title 35, U.S. Code (1952), sec. 266)

The invention described herein may be manufactured and used by or for the Government of the United States of America for governmental purposes without the payment of any royalties thereon or therefor.

This application is a continuation in part of application Serial No. 782,607, filed December 23, 1958, for Aerial Gyro Navigation Track Display and Record System, now abandoned.

The present invention relates to an aerial navigation track display and more particularly to a navigation track display in which a hemispherical map is displayed on a map table.

Prior systems of providing track display and position reference employ the use of gnomonic and Mercator charts, Lambert conformal conic projections and complete systems of celestial navigation. Such devices necessitated highly qualified technicians who were required to use two different map projections on a small scale thereby introducing large distortions in geometric shape and the necessity of transferring information from one projection to another. Radio bearings plotted on Mercator projections were incorrect, and since radar matching systems were rarely used for correction, the radio bearings had to be corrected by a chart in order to plot an electronic counter measure fix. On long flights, the navigator was required to keep lengthy logs, data sheets such as advance position bearings, and a voluminous portfolio of charts.

The present invention employs a rotating, translucent, hemispherical map which moves in response to track angle and track speed of the aircraft, and which is gnomonically projected onto a map table. Since the great circles of the map will be projected as straight lines on the map table, it is not necessary to employ more than one map projection nor to transfer information. Further, there will be no signficant distortion, radio bearings may be directly plotted without correction, and a record of the flight position may be kept without the necessity of preparing lengthy charts and logs. Finally, the navigator is not required to resort to a multitude of charts in plotting the track of the aircraft.

Accordingly, it is an object of this invention to provide a tracking display system which utilizes a single map in plotting the track of an aircraft.

Another object of the invention is to provide a tracking display system in which the track of an aircraft may be recorded without the necessity of preparing a multitude of charts and logs.

Still another object of this invention is to provide a tracking display system in which a hemispherical map is gnomonically projected onto a map table without significant distortion.

Another object of this invention is to provide a tracking display system which may be matched with a radar screen in order to maintain an exact position of the aircraft.

A final object of the invention is to provide a tracking display system in which radio bearings may be directly plotted onto a gnomonically projected map.

Other objects and advantages of the invention will become more fully apparent from the following description of the annexed drawings which illustrate a preferred embodiment, and wherein.

Figure 1:
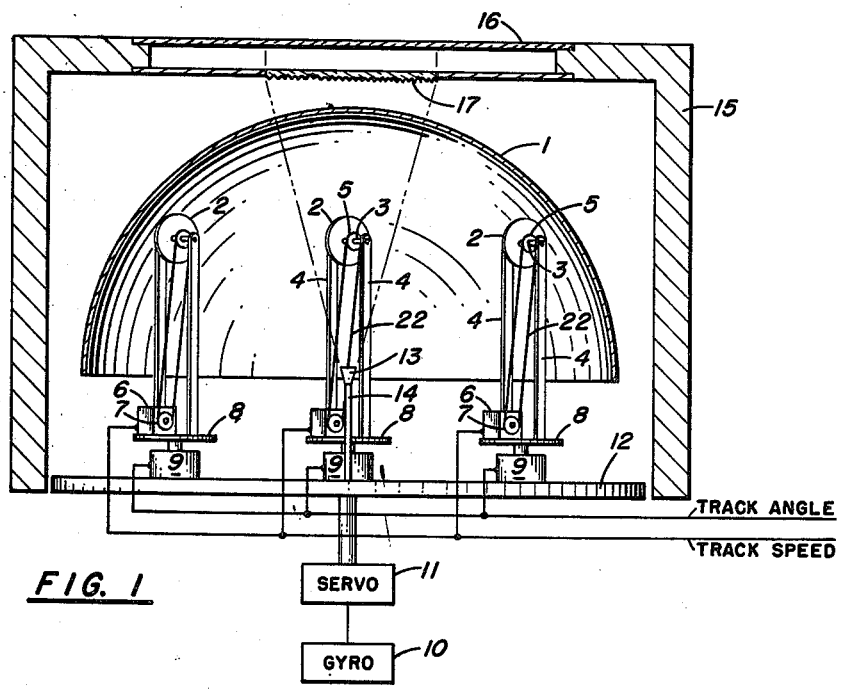
FIG. 1 illustrates a schematic side view of the invention with part of the console cut away.
Figure 2:
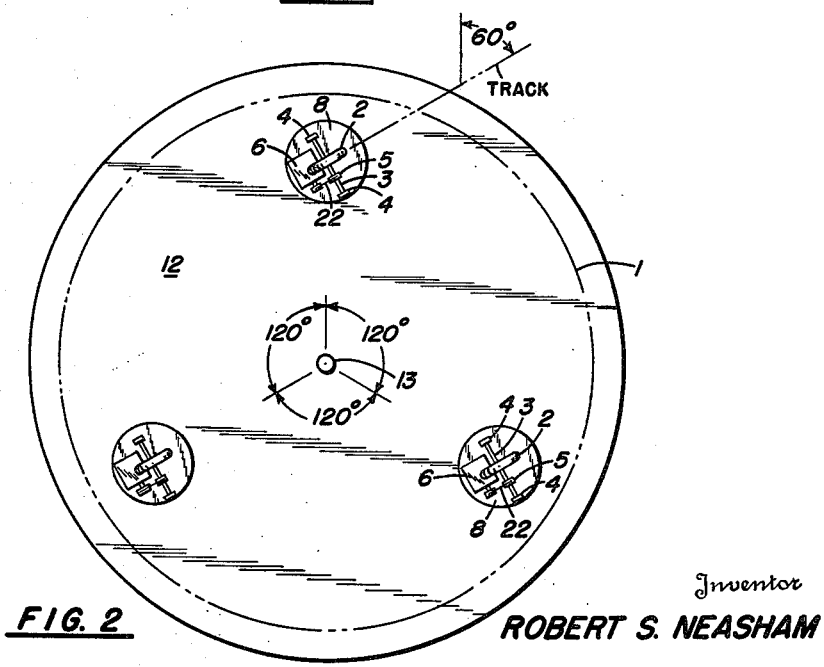
FIG. 2 is a top view of the mechanism for positioning the hemispherical map with the console and shell removed.
Figure 4:
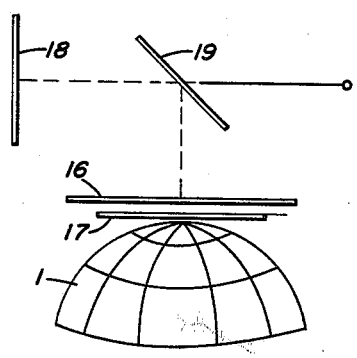
FIG. 4 illustrates a schematic system for matching the map display with a presentation on a radar screen.

Referring to the drawings, wherein like reference characters designate like or corresponding parts throughout the several views, numeral 1 represents a translucent shell which is shaped and mapped out to represent a terrestrial hemisphere. The shell is supported and positioned by wheels 2 which are fixedly mounted on shafts 3. Shafts 3 are rotatably mounted on standards 4 and each shaft has a pulley wheel 5. Mounted below the wheels 2 are variable speed motors 6 which have pulley wheels 7 and which are mounted on track angle platforms 8. Belts 22 are used to connect the pulley wheels of the motors 6 with the pulley wheels 5 of shafts 3. Motors 6 are controlled in their speed by a track angle signal coming from a navigational computer (not shown). Servos 9 are drivingly connected to platforms 8 and are controlled by a track speed signal also coming from a navigational computer (not shown). The navigational computer from which the track angle and track speed signals are derived may be any inertial navigation system, well known in the art, such as that disclosed in U.S. Patent Serial No. 2,953,858, filed March 5, 1954 by W. Wrigley et al., for Navigational Apparatus. Standards 4 are fixedly mounted on platforms 8 so that wheels 2 are orientated by the servos 9. Gyro 10 is a compass gyro controlling servo 11 and servo 11 is drivingly connected to a platform 12 so that the position of platform 12 is mantained in a north direction. The map on shell 1 is initially aligned so that a north direction thereon corresponds with the true north direction at the place of alignment. Thus, as platform 12 is maintained in a north direction the map on shell 1 is maintained in a north direction. A directional light 13 is mounted on standard 14 within shell 1 and standard 14 is fixedly mounted on platform 12. A console 15 is fixedly attached to the aircraft or a ground station and is adapted to contain platform 12 and all components mounted on top of the platform. A translucent plotting surface 16 is mounted in console 15 to receive the map image from shell 1. A lens 17 is mounted between the shell and plotting surface 16 so that the map image is displayed on the plotting surface according to a desired presentation. A mark 20 is inscribed in plotting surface 16 so that it overlays the uppermost point of shell 1. Wheels 2 are positioned so that they are equidistant along the curve of shell 1 from the uppermost point on the shell and positioned so that in a plan view of the wheels 2 the angles between the wheels are equal as shown in FIG. 2. In FIG. 4 numeral 18 represents a radar screen showing a vertical presentation of the terrain immediately below the aircraft and a half silvered mirror 19 is imposed between the display on the plotting surface 16 and the radar screen 18 so that the map image on the plotting surface can be compared with the presentation on the radar screen.

In the operation of the device shell 1 is initially aligned in the true geographical and true north position. Upon the aircraft making tract over the ground shell 1 is positioned under plotting surface 16 so that marker 20 on plotting surface 16 will show on the map image the location of the aircraft. If the track of the aircraft is for instance 060° from the north direction all wheels 2 will be aligned in a 060° direction from north as shown in FIG. 2. This is accomplished by the operation of servos 9 which are all controlled by the same tract angle signal.

Figure 3:
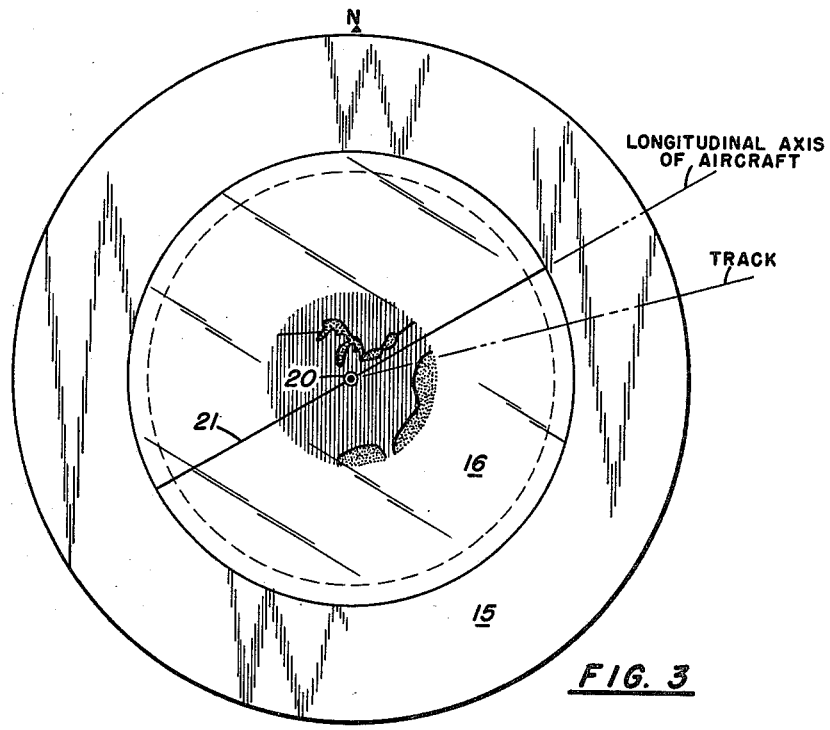
FIG. 3 is a plan view of the map table.

The rotation of the wheels 2 represents tract speed of the aircraft over the ground and is obtained by servos 6 which are controlled by tract speed signals. Thus, it can be seen from FIG. 2 that as the aircraft makes a 060° tract wheels 2 will be orientated in a direction of 060° from north and will rotate at a speed proportional to tract speed. As the aircraft changes course console 15 will also change course but the shell will remain orientated in a north direction by the operation of servo 11 and gyro 10. Thus, it can be seen that the map image on plotting surface 16 at the position of marker 20 will represent the location of the aircraft at all times. A light line 21 may be placed on plotting surface 16 to represent the course direction of the aircraft. It is to be noted that the tract direction of the aircraft may vary from the course direction of the aircraft as shown in FIG. 3 due to the drift of the aircraft. The position of the shell may be checked to determine whether it is orientated with the earth's surface by displaying a vertical radar presentation of the ground immediately below the aircraft on radar screen 18 and superimposing the map image on the radar screen. If the map image does not correspond with the radar presentation shell 1 is lifted from the wheels 2 and positioned so that correspondence is effected. Upon correspondence the shell will be orientated in accordance with the location of the aircraft over the earth's surface.

Obviously many modifications and variations of the present invention are possible in light of the above teachings. It is therefore to be understood that within the scope of the appended claims the invention may be practiced otherwise than as specifically described.

What is claimed is:

1. A device for displaying the navigational track of an aircraft comprising a translucent shell shaped and mapped out to represent a terrestrial hemisphere, means for positioning said shell according to the track speed and track angle of the aircraft, and a light source within said shell for projecting a map image on a plotting surface.

2. The device as claimed in claim 1 including a console adapted to house the shell, a translucent plotting surface mounted in said console so that said light source will project a portion of the map on said plotting surface, and a lens mounted on said console between the shell and said plotting surface for focusing the rays of light on said plotting surface to a desired presentation.

3. The device as claimed in claim 2 wherein the means for positioning said shell comprises at least one wheel driving said shell, means for rotating said wheel according to the track speed of the aircraft and means for orientating said wheel according to the angle of track of said aircraft so that said shell will be moved according to the track of said aircraft over the ground.

4. The device as claimed in claim 2 wherein the means for positioning said shell comprises a plurality of wheels, said wheels engaging and supporting said shell at the shell's concave side, said wheels being positioned equidistant along the curvature of said shell from a point on said shell representing the aircraft's location, means for rotating all the wheels at a speed representing track speed of the aircraft and means for orientating all the wheels at an angle representing track angle of the aircraft so that said shell will be positioned according to the track of said aircraft.

5. The device as claimed in claim 4 wherein said means for rotating all the wheels at a speed representing track speed of the aircraft comprises motor means responsive to signals representing track speed and pulley and belt means operatively connecting said motor means to said wheels.

6. The device as claimed in claim 4 including a radar screen showing a vertical presentation of the terrain below said aircraft and means for superimposing the map projection on said plotting surface with the presentation on said radar screen.

7. The device as claimed in claim 6 wherein the means for superimposing the map projection of said plotting surface on the presentation of said radar screen comprises a half-silvered mirror interposed between said plotting surface and said radar screen.

References Cited in the file of this patent

UNITED STATES PATENTS

| | | |
|---|---|---|
| 2,336,436 | Beindorf | Dec. 7, 1943 |
| 2,431,847 | Van Dusen | Dec. 2, 1947 |
| 2,526,682 | Mulberger et al. | Oct. 24, 1950 |
| 2,532,402 | Herbold | Dec. 5, 1950 |
| 2,608,094 | Best | Aug. 26, 1952 |
| 2,780,132 | Dickson | Feb. 5, 1957 |
| 2,814,199 | Waldorf et al. | Nov. 26, 1957 |